May 3, 1949.  E. M. BRETZ ET AL  2,468,860
MOWER SHARPENER
Filed Jan. 16, 1948
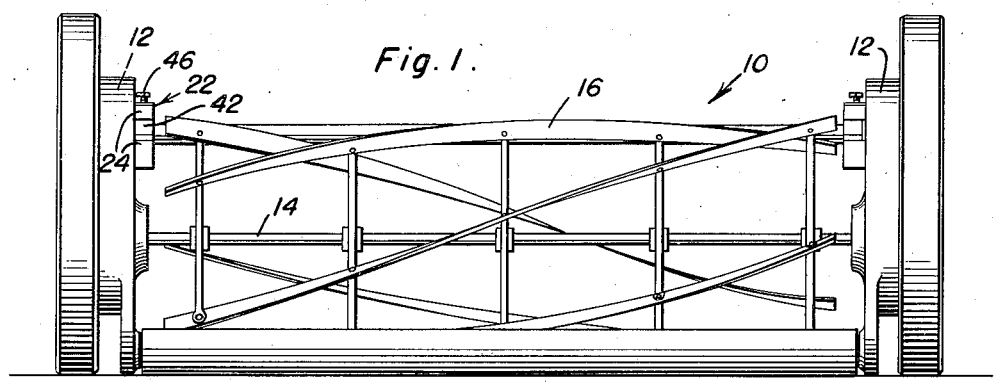
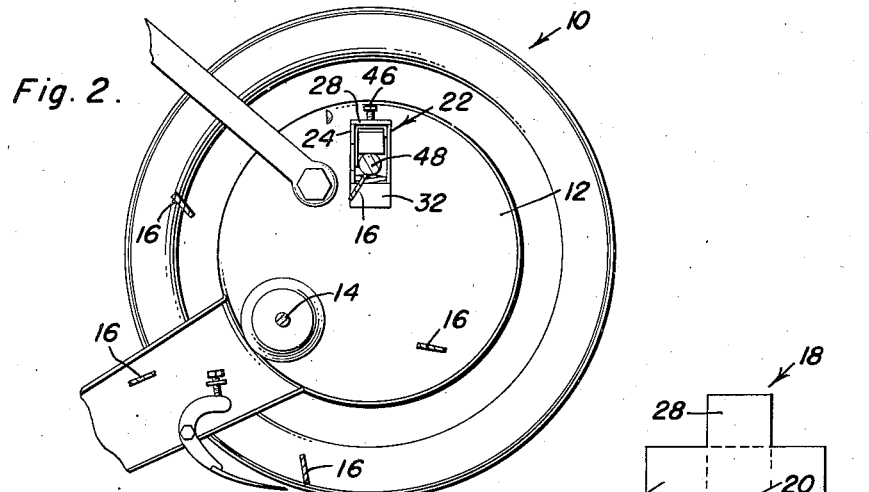
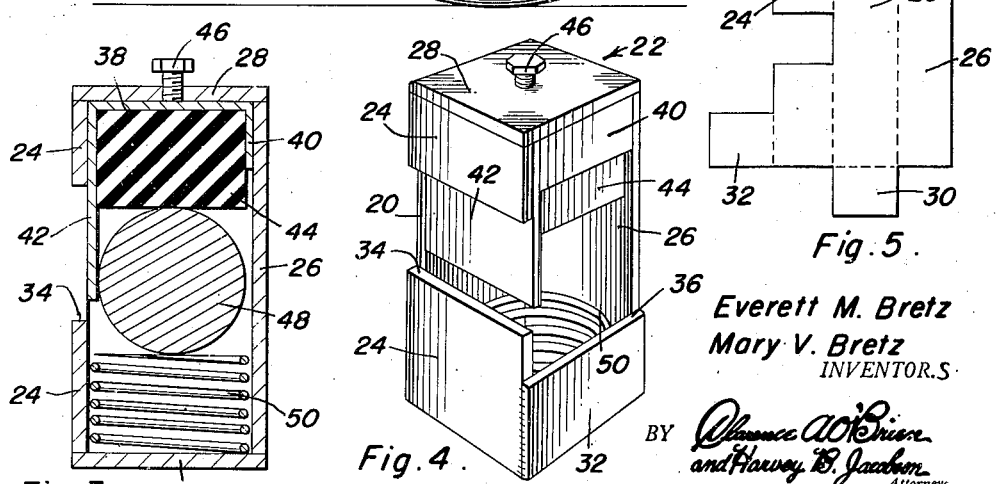
Everett M. Bretz
Mary V. Bretz
INVENTORS Patented May 3, 1949

2,468,860

UNITED STATES PATENT OFFICE 2,468,860

MOWER SHARPENER

Everett M. Bretz and Mary V. Bretz,
De Ridder, La.

Application January 16, 1948, Serial No. 2,746

3 Claims. (Cl. 76—82.1)

This invention relates to new and useful improvements in lawn mowers and the primary object of the present invention is to provide an attachment for lawn mower that will engage and sharpen the cutting blades of a lawn mower during the rotation of said mower blades.

Another important object of the present invention is to provide a mower blade sharpener including a file and novel and improved means for cushioning the file so that the shock transmitted to the same as the mower is pushed forwardly over rough terrain will be greatly reduced to a minimum.

A further object of the present invention is to provide a blade sharpener for lawn mowers that includes an abrasive surfaced member and novel and improved adjusting means conveniently accessible for positioning of the abrasive surfaced member relative to the mower blades.

A still further aim of the present invention is to provide a blade sharpening attachment for lawn mowers and the like that is small and compact in structure, simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary front elevational view of a lawn mower, and showing the present invention applied thereto;

Figure 2 is a vertical sectional view of a lawn mower with parts broken away, and showing the present blade sharpener applied to the same;

Figure 3 is an enlarged longitudinal vertical sectional view taken substantially through the center of one of the support members used in conjunction with the present invention, and showing the file element (in section) applied thereto;

Figure 4 is a a perspective view of one of the support members used in conjunction with the present invention; and, Figure 5 is a plan view of the blank forming the present file supporting members.

Referring now to the drawings in detail, wherein for the purpose of illustration, there is disclosed a preferred embodiment of the present invention, the numeral 10 represents a conventional lawn mower generally, comprising a pair of wheel supporting frames 12, a fixed shaft 14 extending between said supporting frames 12, and a rotary cutter blade 16.

The numeral 18 represents the blank that forms the file supporting members used in conjunction with the present invention. This blank includes a substantially rectangular central portion 20 that forms one side wall for the support member 22, a pair of side sections 24 and 26 that form the forward wall and rear wall for the support member 22. The ends of the central portion 20 project outwardly from the ends of the side sections 24 and 26 to provide a pair of end sections 28 and 30 that form the upper wall and lower wall for the support member 22. Projecting outwardly from the forward wall 24 is a substantially rectangular tab 32 that forms one side wall for the supporting member 22. It should be noted, that there is an opening 34 provided in the forward wall 24 and a guide opening 36 provided in the side wall 32.

Slidably positioned in each of the supporting members 22, is a substantially rectangular supporting plate 38 having a depending peripheral flanged portion 40 one side of which is elongated to provide a stop plate 42 that opposes the opening 34. Fixed in any suitable manner to the supporting plate 38, is a resilient block 44 which is embraced by the flanged portion 40. Threaded fasteners or set screws 46 carried by the upper walls 28 of the supporting members 22 are adjustable for positioning of supporting plate 38 within the supporting members 22.

The numeral 48 represents a substantially circular file or abrasive rod the ends of which extend into the openings 36 provided in the support members 22 and are supported on coil springs 50 positioned within the support members 22.

In practical use of the present invention, the support members 22 are secured in any suitable manner to the wheel supporting frames 12 of the lawn mower 10 so that the file 48 frictionally engages the cutter blade 16 during the rotation thereof. By adjusting the fasteners 46 the positioning of the file 48 relative to the cutter blade may be maintained.

It should be noted, that the springs 50 and pads 44 will reduce and cushion the movement of the file relative to the support members 22 as the mower is pushed over a lawn.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A lawn mower sharpener comprising a pair of opposed substantially channel shaped supports mountable on the wheel supporting frame of a lawn mower, said supports being open on one side to provide guide openings, a file having end portions received in said guide openings and slidably mounted in said supports, spring means mounted in said supports for holding said file, resilient pads carried by said supports frictionally engaging the upper periphery of said file, means slidably mounted in said supports for holding said pads, and means for adjusting said pads against said file.

2. The combination of claim 1 wherein said last mentioned means includes adjustable fasteners carried by said supports for engaging said pad holding means.

3. A lawn mower sharpener comprising a pair of opposed supports mountable on the wheel supporting frame of a lawn mower, said supports having opposed guide openings, a blade sharpener having end portions extendable into the guide openings in said supports, resilient means mounted in said supports on which the end portions of said blade sharpener are disposed, blade sharpener engaging members slidably mounted in said supports frictionally engaging the upper periphery of the blade sharpener, and means for adjusting said blade sharpener engaging member for positioning of said blade sharpener relative to the blades of a lawn mower.

EVERETT M. BRETZ.
MARY V. BRETZ.

REFERENCES CITED

The following references are of record in the file of this patent:

UNITED STATES PATENTS

| Number | Name | Date |
|---|---|---|
| 1,432,193 | Lancaster | Oct. 17, 1922 |
| 1,888,285 | Muir | Nov. 22, 1932 |